(12) United States Patent
Uchikawa et al.

(10) Patent No.: US 6,265,116 B1
(45) Date of Patent: Jul. 24, 2001

(54) PROCESS FOR PRODUCING COLOR FILTER

(75) Inventors: Kiyoshi Uchikawa; Masaru Shida; Hiroshi Komano, all of Kanagawa (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 09/150,615

(22) Filed: Sep. 10, 1998

(30) Foreign Application Priority Data

Sep. 12, 1997 (JP) .................................................. 9-265117

(51) Int. Cl.$^7$ .............................. G02B 5/20; G02F 1/1335
(52) U.S. Cl. .................................................................. 430/7
(58) Field of Search ............................... 430/7, 27, 281.1

(56) References Cited

U.S. PATENT DOCUMENTS 4,613,560 * 9/1986 Dueber et al. ..................... 430/286.1
5,846,677 * 12/1998 Nomura et al. .......................... 430/7

* cited by examiner

Primary Examiner—John A. McPherson
(74) Attorney, Agent, or Firm—Sughrue, Mion, Zinn, Macpeak & Seas, PLLC

(57) ABSTRACT

The present invention provides a photopolymerizable composition for a color filter containing an addition-polymerizable compound having at least one ethylenically unsaturated double bond, a photopolymerization initiator and the oxide of at least one metal selected from the group consisting of Cu, Fe, Mn, Cr, Co, Ni and Al and being substantially free from any halogen atom; and a process for producing a color filter. The photopolymerizable compositions for a color filter makes it possible to form a color filter having good heat resistance and high electrical insulation resistance and have high storage stability.

2 Claims, No Drawings

PROCESS FOR PRODUCING COLOR FILTER

FIELD OF THE INVENTION

The present invention relates to a novel photopolymerizable composition for a color filter and a process for producing the color filter. More particularly, it relates to a photopolymerizable composition which is suitable for manufacturing a spectral filter of each color such as blue, green and red, and a black matrix for a plasma display, a liquid crystal display, etc. and which has excellent heat resistance, high electrical insulation resistance and high storage stability, and a process for producing a color filter with the use of the composition.

BACKGROUND OF THE INVENTION

In manufacturing a display device such as a plasma display and a liquid crystal display, it has been a practice to use spectral filters of various colors such as blue, green and red for spectrally classifying back light, etc. or to provide a black filter as a black matrix to enhance the contrast. To produce these color filters, use is made of photopolymerizable compositions for color filters containing various organic color pigments such as phthalocyanine pigments and azo pigments or light-screening pigments such as carbon black. Color filters are produced by applying the above-mentioned photopolymerizable compositions for color filters, which each has been preferably dissolved in a solvent, on substrates, and drying the same followed by pattern-making by photolithography.

In recent years, it has been desired to use plasma display devices (hereinafter referred to simply as "PDP") in practice. This is because PDPs are usable as displays having an emission luminance comparable to that of CRT displays and a relatively simple structure, which makes it possible to provide large-scaled PDPs and compact apparatuses. It is expected that PDPs provided with color filters of blue, green and red or a black matrix can show an enhanced contrast similar to that of CRT displays. However, the process for manufacturing PDPs includes the step of baking at a temperature of 350 to 750° C. at which the conventional photopolymerizable compositions containing organic pigments or carbon black as the major components would undergo decomposition or volatilization of the pigments or carbon black. Thus, it is difficult to form any satisfactory color filters. To solve this problem, attempts have been made to add inorganic pigments to photopolymerizable compositions for color filters so as to impart heat resistance thereto. In these cases, however, there arises another problem that the photopolymerizable compositions containing inorganic pigments would gel within a short period of time, thus showing poor storage stability.

SUMMARY OF THE INVENTION

Under these circumstances, the present inventors have conducted extensive studies. As a result, they have found out that the rapid gelation of the above-mentioned photopolymerizable composition for a color filter is caused by the presence of halogen atoms and a photopolymerizable composition for a color filter which is substantially free from any halogen atom can achieve good heat resistance, high electrical insulation resistance and high storage stability, thus completing the present invention.

Accordingly, an object of the present invention is to provide a photopolymerizable composition for a color filter which has good heat resistance, high electrical insulation resistance and high storage stability.

Another object of the present invention is to provide a process for producing a color filter by using the photopolymerizable composition for a color filter.

DETAILED DESCRIPTION OF THE INVENTION

To achieve the above-mentioned objects, the present invention relates to a photopolymerizable composition for a color filter containing an addition-polymerizable compound having at least one ethylenically unsaturated double bond, a photopolymerization initiator and metal oxide(s) as a coloring material and being substantially free from any halogen atom and a process for producing a color filter with the use of the same.

The term "an addition-polymerizable compound having at least one ethylenically unsaturated double bond" (hereinafter referred to simply as an "ethylenic compound") as used herein means a compound having at least one ethylenically unsaturated double bond to cause addition-polymerization and curing under the action of the photopolymerization initiator, when the photopolymerizable composition is irradiated with energy radiation. Namely, it means a monomer having the above-mentioned ethylenically unsaturated double bond or a polymer having the ethylenically unsaturated double bond in the side chain or the main chain thereof. The term "monomer" as used herein means those to be distinguished from "polymer" and includes not only "monomers" in a narrow sense but also dimers, trimers and oligomers. Examples of the monomer include unsaturated carboxylic acids; esters of aliphatic (poly)hydroxy compounds with unsaturated carboxylic acids; esters of aromatic (poly)hydroxy compounds with unsaturated carboxylic acids; esters obtained by esterification reaction of an unsaturated carboxylic acid, a polyvalent carboxylic acid and a polyvalent hydroxy compound such as the above-mentioned aliphatic (poly)hydroxy compounds and aromatic (poly)hydroxy compounds; unsaturated carboxylic acid amides; and unsaturated carboxylic acid nitrites. More particularly, useful examples thereof include methyl acrylate, methyl methacrylate, ethyl acrylate, ethyl methacrylate, isobutyl acrylate, isobutyl methacrylate, 2-hydroxyethyl acrylate, 2-hydroxyethyl methacrylate, ethylene glycol monomethyl ether acrylate, ethylene glycol monomethyl ether methacrylate, ethylene glycol monoethyl ether acrylate, ethylene glycol monoethyl ether methacrylate, glycerol acrylate, glycerol methacrylate, acrylamide, methacrylamide, acrylonitrile, methacrylonitrile, 2-ethylhexyl acrylate, 2-ethylhexyl methacrylate, benzyl acrylate, benzyl methacrylate, ethylene glycol diacrylate, ethylene glycol dimethacrylate, triethylene glycol diacrylate, triethylene glycol dimethacrylate, tetraethylene glycol diacrylate, tetraethylene glycol dimethacrylate, butylene glycol dimethacrylate, propylene glycol diacrylate, propylene glycol dimethacrylate, trimethylolethane triacrylate, trimethylolethane trimethacrylate, trimethylolpropane triacrylate, trimethylolpropane trimethacrylate, tetramethylolpropane tetracrylate, tetramethylolpropane tetramethacrylate, pentaerythritol triacrylate, pentaerythritol trimethacrylate, pentaerythritol tetracrylate, pentaerythritol tetramethacrylate, dipentaerythritol pentacrylate, dipentaerythritol pentamethacrylate, dipentaerythritol hexacrylate, dipentaerythritol hexamethacrylate, 1,6-hexanediol diacrylate, 1,6-hexanediol dimethacrylate, cardoepoxy diacrylate, cardoepoxy dimethacrylate, the compounds in which the acrylate or methacrylate in the aboveexemplified compounds is replaced with fumarate, maleate, crotonate or itaconate, acrylic acid, methacrylic acid, fumaric acid, maleic acid, crotonic acid, itaconic acid, hydroquinone monoacrylate, hydroquinone monomethacrylate, hydroquinone diacrylate, hydroquinone dimethacrylate, resorcin diacrylate, resorcin dimethacrylate, pyrogallol diacrylate, pyrogallol triacrylate, condensation products of diethylene glycol with acrylic acid or maleic acid, condensation products of diethylene glycol with phthalic acid, condensation products of pentaerythritol with methacrylic acid or terephthalic acid, condensation products of butanediol or glycerol with acrylic acid or adipic acid, ethylenebisacrylamide, ethylenebismethacrylamide, allyl esters such as diallyl phthalate, and divinyl phthalate.

Examples of the polymers having the ethylenically unsaturated double bond in the side chain or main chain thereof include polyesters obtained by the polycondensation between unsaturated divalent carboxylic acids with dihydroxy compounds; polyamides obtained by the polycondensation between unsaturated divalent carboxylic acids with a diamine; polyesters obtained by the polycondensation between itaconic acid, propylidenesuccinic acid or ethylidenemalonic acid with a dihydroxy compound; polyamides obtained by the polycondensation between itaconic acid, propylidenesuccinic acid or ethylidenemalonic acid with a diamine; phenol novolak type epoxyacrylate; phenol novolak type epoxymethacrylate; cresol novolak type epoxy acrylate; cresol novolak type epoxymethacrylate, bisphenol A type epoxyacrylate; bisphenol S type epoxyacrylate; urethane acrylate oligomers; and urethane methacrylate oligomers. Also, use may be made therefor of polymers obtained by further reacting the above-mentioned epoxy(meth) acrylate resins with polybasic acid anhydrides. Moreover, use can be made therefor of polymers having reactive functional groups (hydroxyl, haloalkyl, etc.) in side chains, for example, those obtained by reacting polyvinyl alcohol, poly(2-hydroxyethyl methacrylate), polyepichlorohydrin, etc. with unsaturated carboxylic acids such as acrylic acid, methacrylic acid, fumaric acid, maleic acid, crotonic acid and itaconic acid. Among all, it is particularly preferable to use acrylate or methacrylate monomers therefor.

The ethylenic compound as described above can be used in an amount of from 50 to 99 parts by weight per 100 parts by weight of the sum of the ethylenic compound and the photopolymerization initiator. It is not preferable that the content of the ethylenic compound is less than 60 parts by weight, since the abrasion resistance and chemical resistance of the film obtained after the exposure and curing are deteriorated. Furthermore, it is not preferable that the content thereof exceeds 99 parts by weight, since the sensitivity is sometimes lowered in such a case.

Triazine compounds have been frequently employed as a photopolymerization initiator due to the high sensitivity thereof. However, the use of the compounds containing a trihalomethane group causes gelation and is not preferred. Examples of the photopolymerization initiator usable in the present invention include 1-, hydroxycyclohexyl phenyl ketone,2,2-dimethoxy-1,2-diphenylethan-1-one, 2-methyl-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenylpropan-1-one, 2,4,6-trimethylbenzoyldiphenyl phosphine oxide, 1-[4-(2-hydroxyethoxy)phenyl]-2-hydroxy-2-methyl-1-propan-1-one, 2,4-diethylthioxanthone, 2,4-dimethylthioxathone, 3,3-dimethyl-4-methoxybenzophenone, benzophenone, 1-(4-isopropylphenyl)-2-hydroxy-2-methylpropan-1-one, 1-(4-dodecylphenyl)-2-hydroxy-2-methylpropan-1-one, 4-benzoyl-4'-methyldimethylsulfide, 4-dimethylamninobenzoic acid, methyl 4-dimethylaminobenzoate, ethyl 4-dimethylaminobenzoate, butyl 4-dimethylaminobenzoate, 2-ethylhexyl 4-dimethylaminobenzoate, 2-isoamyl 4-dimethylaniinobenzoate, 2,2-diethoxyacetophenone, benzyl dimethyl ketal, benzyl-β-methoxyethyl acetal, 1-phenyl-1,2-propanedione-2-(o-ethoxycarbonIyl)oxime, methyl o-benzoylbenzoate,bis(4-dimethylaminophenyl)ketone, 4,4'-bisdiethylaminobenzophenone, benzyl, benzoin, benzoin methyl ether, benzoin ethyl ether, benzoin isopropyl ether, benzoin-n-butyl ether, benzoin isobutyl ether, benzoin butyl ether, p-dimethylaminoaceto-phenone, thioxanthone, 2-methyl thioxathone, 2-isopropyl thioxathone, dibenzosuberone, α,α-dichloro-4-phenoxyacetophenone and pentyl-4-dimethylaminobenzoate. Amaong all, 2-benzyl-2-dimethylamino-1-(4- morpholinophenyl)butan-1-one is particularly preferred from the viewpoints of sensitivity and stability.

The photopolymerizable composition for a color filter of the present invention may further contain, as a coloring material, oxides, sulfides, sulfates or carbonates of various metals such as Cu, Fe, Mn, Cr, Co, Ni, Ti, V, Zn, Se, Mg, Ca, Sr, Ba, Pd, Ag, Cd, In, Sn, Sb, Hg, Pb, Bi, Si and Al. It is particularly preferable to use the oxide of at least one metal selected from among Cu, Fe, Mn, Cr, Co, Ni and Al. Use of such a metal oxide makes it possible to form an excellent color filter and, moreover, provide a display device having a high electrical insulation resistance, suffering from little current leakage and consuming a low electric power. It is further preferable that the metal oxide has an average particle size of from 0.01 to 5 μm. When the average particle size falls within the range as specified above, color filters, for example, spectral filters of blue, green or red and black filters having excellent qualities can be produced. Even when baked at 350 to 750° C., the photopolymerizable composition for a color filter of the present invention suffers from neither decomposition nor volatilization of the metal oxide and thus ensures the production of a color filter having excellent quality.

Particular examples of the above-mentioned metal oxide include $Fe_2O_3.CuO$, $Fe_3O_4.CuO$, $MnO_2.CuO$, $CuO.Cr_2O_3$, $CuO.CoO$, $CuO.NiO$, $Fe_2O_3.MnO_2.CuO$, $Fe_3O_4.MnO_2.CuO$, $MnO_2.CuO.Cr_2O_3$, $MnO_2.CuO.CoO$, $MnO_2.CuO.NiO$, $Fe_2O_3.Fe_3O_4.MnO_2.CuO$, $Fe_2O_3.Fe_3O_4.MnO_2.CuO.Cr_2O_3$, $Fe_2O_3.Fe_3O_4.MnO_2.CuO.CoO$, $Fe_2O_3.Fe_3O_4.MnO_2.CuO.NiO$, $Fe_2O_3.Fe_3O_4.MnO_2.CuO.Cr_2O_3.CoO$, $Fe_2O_3.Fe_3O_4.MnO_2.CuO.Cr_2O_3.NiO$, and $Fe_2O_3.FeO_3O_4.MnO_2.CuO.Cr_2O_3.CoO.NiO$, though the present invention is not restricted thereto. Among all, it is preferable to use Cu oxides, Fe oxides or Mn oxides such as $Fe_2O_3.MnO_2.CuO$, $Fe_3O_4.MnO_z.CuO$, $Fe_2O_3.Fe_3O_4.MnO_2.CuO$, $Fe_2O_3.Fe_3O_4.MnO_2.CuO.Cr_2O_3$, $Fe_2O_3.Fe_3O_4.MnO_2.CUO.CoO$, $Fe_2O_3.Fe_3O_4.MnO_2.CuO.NiO$, $Fe_2O_3.Fe_3O_4.MnO_2.CuO.Cr_2O_3.CoO$, $Fe_2O_3.Fe_3O_4.MnO_2.CuO.Cr_2O_3.NiO$, and $Fe_2O_3.Fe_3O_4.MnO_2.CuO.Cr_2O_3.CoO.NiO$.

The above-mentioned metal oxide can be used generally in an amount of from 10 to 90 parts by weight per 100 parts by weight of the total amount of the ethylenic compound, the photopolymerization initiator and the metal oxide.

The photopolymerizable composition for a color filter can further contain a low-melting glass. Examples of the low-melting glass include phosphorus compounds such as $P_2O_5$, $H_3PO_3$, $H_2PO_4$, $H_4P_2O_7$,$(RO)_3P$, $(PO)_2$, $POH$,$(RO)_3PO$, $RP(OR')_2$, $R_2P(OH)$, $R_2PO(OH)$ and $RPO(OH)_2$; boron compounds such as $B_2O_3$, $H_3BO_3$, $(RO)_3B$, $RB(OR')_2$, $R_2BOR'$, $RB(OH)_2$, $R_2BOH$, $R_3B_x(RBO)_n$ and $(RB_2)_2O$; arsenic compounds such as $H_2AsO_3$, $H_3AsO_4$, $(RO)_3As$, $(RO)_2AsOH$, $RAs(OR')_2$, $RAsH_2$, $R_2AsH$, $R_3As$, $RAsO$, $(R_2As)_2O$, $R_3AsO$, $RAs(OH)_2$, $RAsO(OH)_2$ and $R_2As(OH)$; antimony compounds such as $H_3SbO_4$, $H_3SbO_3$, $H_3Sb_2O_7$, $H_3SbO_{10}$, $(RO)_3Sb$, $(RO)_2Sb(OH)$, $RSb(OR')_2$, $R_5Sb$, $RSbO$, $(R_2Sb)_2O$, $R_3SbO$, $R_2SbO(OH)$ and $RSbO(OH)_2$; zinc compounds such as $Zn(OCOCH_3)$ and $Zn(OR)_2$; lead compounds such as $Pb(OCOCH_3)_4$ and $Pb(OR)_4$; and gallium compounds such as $RGa(OH)$ and $RGa(OH)_2$ (wherein R and R' represent each an alkyl or aryl group); and mixtures thereof. After the completion of the baking, this low-melting glass serves as a binder for the metal oxide to thereby give a rigid color filter.

The photopolymerizable composition for a color filter of the present invention is substantially free from any halogen atom. The term "substantially free from any halogen atom" means that when measured by using a polarized Zeeman atomic absorption spectrometer, the content of halogen atoms is 0.001 part by weight or less per 100 parts by weight of the metal oxide. Furthermore, it is preferred that when measured by using a mass spectrometer, the content of halogen atoms covalently bonded to carbon atoms is 0.0001 part by weight or less per 100 parts by weight of the metal oxide. Needless to say, it is desirable that the photopolymerizable composition contains no halogen atom. However, halogen atoms, which are contained as impurities in each component, should be eliminated as far as possible. The photopolymerizable composition for a color filter of the present invention, which is substantially free from any halogen atom as described above, would not gel within a short period of time and, therefore, shows a high storage stability. The halogen atoms as described above include fluorine, chlorine, bromine, iodine and astatine atoms.

The photopolymerizable composition for a color filter of the present invention may further contain a polymer binder in order to improve the application properties thereof and the physical properties after photo-curing. A suitable binder can be selected depending on the factor to be improved, for example, compatibility, film-forming properties, developing properties, adhesiveness, etc. Particular examples of the polymer binder include polymers or copolymers prepared by polymerizing or copolymerizing monomers selected from acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzyl methacrylate, phenoxy acrylate, phenoxy methacrylate, isobornyl acrylate, isobornyl methacrylate, glycidyl methacrylate, styrene, acrylamide, methacrylamide, acrylonitrile, methyacrylonitrile, vinyl chloride and vinylidene chloride; modified acidic cellulose derivatives having carboxyl group in side chain; polyethylene oxide; polyvinyl pyrrolidone; a copolymer of vinylidene chloride and vinyl acetate; a copolymer of a chlorinated polyolefin and vinyl acetate; a copolymer of vinyl chloride and vinyl acetate; polyvinyl acetate; a copolymer of acrylonitrile and butadiene; polyvinyl alkyl ethers; polyvinyl alkyl ketones; polystyrene; polyamides; polyurethane; polyethylene terephthalate isophthalate; acetyl cellulose; and polyvinyl butyral. It is particularly preferable to use a monomer having carboxyl group (acrylic acid, methacrylic acid, etc.) as a comonomer so as to improve the developing properties with an alkaline aqueous solution. It is preferable that the content of the acrylic acid, methacrylic acid, etc. as described above amounts to 5 to 40% by weight based on the total comonomers. Also, it is preferable to use carboxymethyl cellulose, carboxyethyl cellulose and carboxypropyl cellulose or cellulose resins prepared by reacting the hydroxyl groups of hydroxymethyl cellulose, hydroxyethyl cellulose or hydroxypropyl cellulose with polybasic acid anhydrides.

The content of the polymer binder is generally 400 parts by weight or less, preferably 200 parts by weight or less, per 100 parts by weight of the total amount of the ethylenic compound, the photopolymerization initiator and the metal oxide.

To improve the application properties, the photopolymerizable composition for a color filter of the present invention may further contain a solvent. Examples of the solvent include ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dipropyl ether, propylene glycol monomethyl ether, propylene glycol monoethyl ether, propylene glycol monopropyl ether, propylene glycol monobutyl ether, propylene glycol dimethyl ether, propylene glycol diethyl ether, diethylene glycol monomethyl ether, diethylene glycol monoethyl ether, diethylene glycol dimethyl ether, diethylene glycol diethyl ether, ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, acetone, methyl ethyl ketone, diethyl ketone, methyl isobutyl ketone, ethyl isobutyl ketone, methyl carbonate, ethyl carbonate, propyl carbonate, butyl carbonate, benzene, toluene, xylene, cyclohexanone, methanol, ethanol, propanol, butanol, hexanol, cyclohexanol, ethylene glycol, diethylene glycol and glycerol. Among all, it is preferable to use 3-methoxybutyl acetate therefor.

The content of the above-mentioned solvent is generally 1,000 parts by weight or less, preferably 500 parts by weight or less, per 100 parts by weight of the total amount of the ethylenic compound, the photopolymerization initiator and the metal oxide.

In addition to the components as described above, the photopolymerizable composition for a color filter of the present invention may further contain a sensitizer, a thermal polymerization inhibitor, a plasticizer, a surfactant, a defoaming agent and other additives, if needed. Examples of the sensitizer include xanthene dyestuffs such as Eosin B (C.I. No. 45400), Eosin J (C.I. No. 45380), alcohol-soluble eosin (C.I. No. 45386), cyanosin (C.I. No. 45410), Bengal rose, erythrosin (C.I.No. 45430), 2,3,7-trihydroxy-9-phenylxanthen-6-one and rhodamine 6G; thiazine dyestuffs such as thionine (C.I. No. 52000), Azure A (C.I. No. 52005) and Azure C (C.I. No. 52002); pyronine dyestuffs such as Pyronine B (C.I. No. 45005) and Pyronine GY (C.I. No. 45006); and coumarin compounds such as 3-acetylcoumarin and 3-acetyl-7-diethylaminocoumarin. Examples of the thermal polymerization inhibitor include hydroquinone, hydroquinone monoethyl ether, p-methoxy phenol, pyrogallol, catechol, 2,6-di-tert-butyl-p-cresol and β-naphthol. Examples of the plasticizer include dioctyl phthalate, didoecyl phthalate, triethylene glycol dicaprylate, dimethyl glycol phthalate, tricresyl phosphate, dioctyl adipate, dibutyl cebacate and triacetyl glycerol. Examples of the surfactants include anionic, cationic and nonionic surfactants of various types. Examples of the defoaming agents include various defoaming agents such as silicone series and fluorine series.

Next, an example of the process for producing a color filter of the present invention will be described.

1) Preparation of Photopolymerizable Composition for Color Filter

To a photopolymerizable composition for color filter are added, if needed, a binder, a solvent, a sensitizer, a thermal polymerization inhibitor, a plasticizer, a surfactant, a defoaming agent, etc. and the resultant mixture is well dispersed and kneaded in a triple roll mill, a ball mill, a sand mill, a jet mill, etc.

2) Application of Photopolymerizable Composition for Color Filter

The photopolymerizable composition for a color filter prepared above is applied onto a substrate the surface of which has been preliminarily cleaned. Examples of the substrate include those made of glass, polyethylene terephthalate, an acrylic resin, etc. To improve the adhesiveness of the photopolymerizable composition to the substrate, a silane coupling agent may be preliminarily added to the photopolymerizable composition or applied on the substrate. To apply the photopolymerizable composition for a color filter, use can be made of a contact transfer coating apparatus such as a roll coater, a reverse coater or a bar coater, or a non-contact transfer coating apparatus such as a spinner or a curtain flow coater. To form a thick film, the composition is applied twice or more. Alternatively, several coating apparatuses selected from among the above-mentioned one may be employed therefor. After the application, the photopolymerizable composition for a color filter is allowed to stand at room temperature for several hours to several days or in a hot-air heater or an infrared heater for several ten minutes to several hours to thereby remove the solvent therefrom. The coating film thus formed has a thickness of approximately from 1 to 10 μm.

3) Exposure

After the formation of the coating film, it is exposed, via a negative mask, to actinic energy radiation such as UV rays, eximer laser, X-ray, γ-ray and electron radiations. The irradiation dose of the energy radiation preferably ranges from 30 to 2,000 mJ/cm$^2$, though it may vary depending on the components of the photopolymerizable composition.

4) Development

After the completion of the exposure, developing is performed by dipping, spraying, etc. with the use of a developer solution. As the liquid developer, use may be made of aqueous solutions of hydroxides, carbonates, bicarbonates, phosphates and pyrophosphates of alkali metals (lithium, sodium, potassium, etc.), primary amines (benzylamine, butylamine, etc.), secondary amines (dimethylamine, dibenzylamine, diethanolamine, etc.), tertiary amines (trimethylamine, triethylamine, triethanolamine, etc.), cyclic amines (morpholine, piperazine, pyridine, etc.), polyamines (ethylenediamine, hexamethylenediamine, etc.), ammonium hydroxides (tetraethylammonium hydroxide, trimethylbenzylammonium hydroxide, tirmethylphenylbenzylammonium hydroxide, etc.), sulfonium hydroxides (trimethylsulfonium hydroxide, diethylmethylsulfonium hydroxide, dimethylbenzylsulfonium hydroxide, etc.), choline, etc.

The production of a color filter for liquid crystal displays, etc. with the use of the photopolymerizable composition of the present invention is completed by the above-mentioned developing step. To produce a color filter for PDPs, however, the additional step of baking should be further carried out.

5) Baking

After the completion of the developing and drying, the color filter thus formed is baked at a temperature of 350 to 750° C. Thus the components of the color filter other than the metal oxide are thermally decomposed and volatilized to give a color filter containing the metal oxide. This baking step, whereby all organic matters are removed from the color filter, contributes to the provision of error-free PDPs.

As discussed above, the photopolymerizable composition for a color filter of the present invention is effective in manufacturing PDPs and liquid crystal displays. Moreover, the composition is well applicable to the production of color filters of other display devices. Among all, the photopolymerizable composition of the present invention is most preferable for manufacturing PDP.

To further illustrate the present invention in greater detail, and not by way of limitation, the following Examples will be given.

EXAMPLE 1

The components 1 to 6 as will specified below were dispersed and kneaded together in a ball mill for 2 hours to thereby give a photopolymerizable composition for a color filter.

|   | (parts by weight) |
|---|---|
| 1. Daipyroxide color #9560 (manufactured by Dainichiseika Colour & Chemicals Mfg. Co., Ltd.; $Fe_2O_3 \cdot MnO_2 \cdot CuO$-based pigment) | 40 |
| 2. Methacrylic acid/methyl methacrylate copolymer (ratio by weight: 25/75 and weight-average-molecular weight: ca. 25000) | 15 |
| 3. Trimethylolpropane triacrylate | 9 |
| 4. 2-Benzyl-2-dimethylamino-1-(4-morpholinophenyl)-butan-1-one (manufactured by Ciba-Geigy: IRGACURE 369) | 3 |
| 5. diethylthioxanthone | 1 |
| 6. 3-methoxybutyl acetate | 55 |

When measured with a polarized Zeeman atomic absorption spectrometer (manufactured by Hitachi., Ltd.), the photopolymerizable composition for a color filter thus obtained contained 0.0002 parts by weight of halogen atoms per 100 parts by weight of the metal oxide. When measured with a mass spectrometer (GMSM; manufactured by Otsuka Electron Co., Ltd.), this composition contained 0.00005 parts by weight of halogen atoms covalently bonded to carbon atoms per 100 parts by weight of the metal oxide.

When the photopolymerizable composition for a color filter prepared above was allowed to stand at ordinary temperature for 6 months, there arose no deterioration such as gelation. After allowing to stand for 6 months, the photopolymerizable composition for a color filter was applied onto a glass substrate (thickness: 3 mm) having a clean surface by using a reverse coater (manufactured by Dainippon Screen Mfg. Co., Ltd.) in such a manner as to give a dry film thickness of 2 μm and then dried at 80° C. for 1 minute. Next, it was entirely irradiated with 800 mJ/cm² of UV rays and then baked in an electric oven at 540° C. for 30 minutes. When the substrate was irradiated from behind with a three band fluorescent lamp, it showed no color shading, which indicated that it was an excellent black matrix. The OD (optical density) value of the composition indicating its light-screening properties was 2.5, while its electrical insulation resistance determined with a High Resistance Meter 4339 A (manufactured by Hewlett-Packard) was $8.51 \times 10^{12}$ Ω/□.

Similarly, the photopolymerizable composition for a color filter was applied on a glass substrate and dried. Then it was exposed to light via a nega mask, developed at 25° C. for 90 seconds with the use of a 2% aqueous solution of sodium carbonate and baked. The black matrix thus obtained was an excellent one which showed neither defect, peeling nor discoloration in the exposed part and no residue in the unexposed part.

COMPARATIVE EXAMPLE 1

The components 1 to 6 as will specified below were dispersed and kneaded together in a ball mill for 2 hours to thereby give a photopolymerizable composition for a color filter.

|  | (parts by weight) |
|---|---|
| 1. Daipyroxide color #9560 (manufactured by Dainichiseika Colour & Chemicals Mfg. Co., Ltd.; $Fe_2O_3.MnO_2.CuO$-based pigment) | 40 |
| 2. Methacrylic acid/methyl methacrylate copolymer (ratio by weight; 25/75, and weight-average molecular weight: ca. 25000) | 15 |
| 3. Trimethylolpropane triacrylate | 9 |
| 4. 2,4-bis-trichloromethyl-6-[di(ethoxycarbonyl-methyl)amino]phenyl-s-triazine | 3 |
| 5. Diethylthioxanthone | 1 |
| 6. 3-Methoxybutyl acetate | 55 |

When measured in the same manner as in Example 1, the photopolymerizable composition for a color filter thus obtained contained 1.26 parts by weight of halogen atoms per 100 parts by weight of the metal oxide. Similarly, this composition contained 1.26 parts by weight of halogen atoms covalently bonded to carbon atoms per 100 parts by weight of the metal oxide.

When the photopolymerizable composition for a color filter prepared above was allowed to stand at ordinary temperature for 6 months, it underwent gelation and, therefore, could not be used in producing a color filter.

The photopolymerizable composition for a color filter of the present invention has high storage stability without causing gelation. The color filters produced by using the composition exhibits excellent heat resistance and high electrical insulation resistance. Therefore, the composition is suitable as a photopolymerizable composition for producing spectral filters of various colors (blue, green, red, etc.) and a black filter for PDPs and liquid crystal displays, and is particularly useful in PDPs.

While the invention has been described in detail and with reference to specific examples thereof, it will be apparent to one skilled in the art that various changes and modifications can be made therein without departing from the spirit and scope thereof.

What is claimed is:

1. A process for producing a color filter which comprises applying a photopolymerizable composition for a color filter (1) containing an addition-polymerizable compound having at least one ethylenically unsaturated double bond, a photopolymerization initiator and metal oxide(s) and (2) being substantially free from any halogen atom on a substrate; drying the same; then selectively irradiating the same with actinic radiation; and developing to thereby form a desired color pattern.

2. The process for producing a color filter as claimed in claim 1, wherein, after the formation of said desired pattern, baking is further performed at a temperature of 350 to 750° C.

* * * * *